INVENTORS
Albert M. Skellett &
Vladimir K. Zworykin.
BY
Wesley G. Carr
ATTORNEY

Aug. 2, 1932.  A. M. SKELLETT ET AL  1,869,829
FREQUENCY RESPONSIVE CRYSTAL RELAY
Filed Jan. 3, 1927  2 Sheets-Sheet 2

WITNESSES:
E. A. McCloskey.
W. H. Whitten, Jr.

INVENTORS
Albert M. Skellett &
Vladimir K. Zworykin.
BY
Wesley G. Carr
ATTORNEY

Patented Aug. 2, 1932

1,869,829

UNITED STATES PATENT OFFICE

ALBERT M. SKELLETT, OF ST. LOUIS, MISSOURI, AND VLADIMIR K. ZWORYKIN, OF SWISSVALE, PENNSYLVANIA, ASSIGNORS TO WESTINGHOUSE ELECTRIC & MANUFACTURING COMPANY, A CORPORATION OF PENNSYLVANIA

FREQUENCY-RESPONSIVE CRYSTAL RELAY

Application filed January 3, 1927. Serial No. 158,608.

Our invention relates to frequency-controlled systems and particularly to relays having a frequency-responsive character.

It is an object of our invention to produce a relay which shall be sensitive to very small changes in frequency.

It is a further object of our invention to produce a system in which very sharp response may be had to a particular frequency, the system remaining unresponsive to frequencies which differ but slightly from the predetermined frequency and responding to the predetermined frequency with certainty.

It is a further object of our invention to take advantage of the circumstance that, when a piezo-electric crystal responds resonantly to an impressed frequency, a relatively high potential is developed across the electrodes associated with the crystal.

It is a further object of our invention to utilize this characteristic potential to ironize a gas.

It is a further object of our invention to cause the ionization of a gas to act as a circuit-closing device and thereby to control a translating device.

It is a further object of our invention to provide a combination of a space-current device and a crystal-containing tube with means whereby the negative charge, normally on the grid, may be caused to leak away when the gas in the tube containing the crystal becomes conductive.

It has been recognized that, if a piezo-electric crystal, in an atmosphere of gas at low pressure, be subjected to a periodic potential, as the frequency of the potential is varied, the gas around the crystal will glow when the frequency of the potential is nearly coincident with the natural period of the crystal. A change in the character of the glow occurs when the exact period of the crystal is reached. This change has mistakenly been described as a glow of the crystal itself.

We have discovered that the range of frequencies, over which the glow occurs, may be considerably narrowed by so reducing the impressed voltage that it is just possible to perceive the glow when the critical frequency is reached. We have also discovered that, as the frequency changes produce the glow, the gas within the tube becomes conductive, and our invention includes employing the change in the conductivity of the gas as a circuit-controlling expedient.

Other objects of our invention will become apparent from the following detailed description and the accompanying drawing in which.

Figure 1:
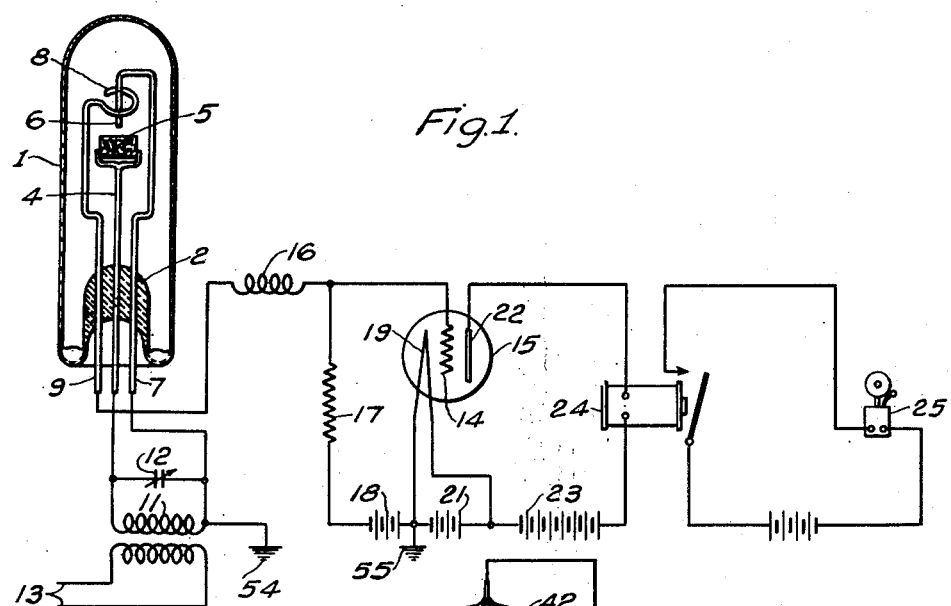
Fig. 1 is an illustration, partly diagrammatic and partly in section, of one form of our invention.

The tube 1 is preferably of glass and supplied with a press 2 through which leads extend into the interior of the tube. The tube is filled with neon, argon, helium or any other inert and readily ionized gas. The gas pressure within the tube is of the order of a few millimeters of mercury, preferably from one to three, although the invention is applicable to other pressures.

The lead 4 through the press 2 serves as a standard, supporting a piezo-electric crystal 5. This crystal may be of any piezo-electric substance but preferably of quartz. The thickness of the crystal in the direction of the standard determines the frequency. As the other dimensions of the crystal are unimportant, very small pieces of crystal may be utilized. Consequently, pieces from the pyramids at the ends of the crystal, which heretofore have been regarded as unsuitable for piezo-electric purposes, may be employed in our invention.

The standard 4 and the enlargement thereof supporting the crystal serve as one of the electrodes for impressing an electric field upon the crystal. The other electrode 6 preferably extends into proximity, but not into contact, with the opposite face of the crystal. The lead 7 connects the electrode 6 with the exterior of the tube.

A third electrode 8 is provided which surrounds, but does not engage, the electrode 6.

The lead 9 connects the electrode 8 to the exterior of the tube.

A circuit, including an inductance 11 and a condenser 12, which may be tuned to approximately the natural frequency of the crystal 5, is connected across the leads 4 and 7. Energy is impressed upon the circuit 11—12 from any source 13.

The lead 9 is connected to the grid 14 of a vacuum tube 15. The connection includes a radio-frequency choke coil 16, and the tube is provided with a grid leak 17 and a grid-biasing battery 18. The cathode 19 is heated, in the usual way, by a battery 21, and the anode 22 is energized by a battery 23.

In circuit between the anode 22 and the cathode 19 is inserted any suitable translating device; for the purpose of illustration, a relay 24 is shown, controlling a circuit having an electric bell 25.

Figure 2:
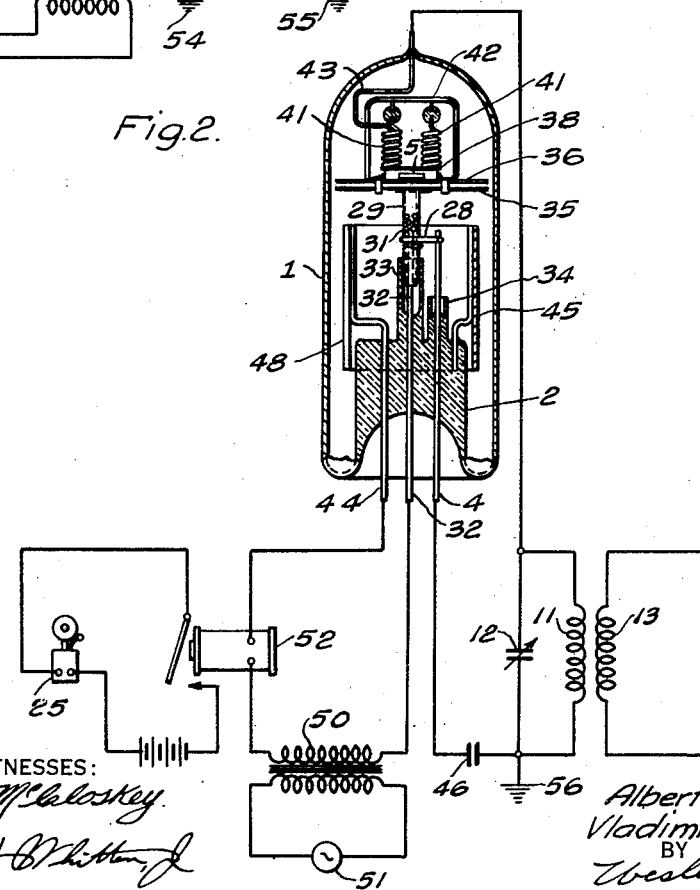
Fig. 2 is a similar illustration of another form of our invention.

In the form of our device illustrated in Fig. 2, the tube 1 is filled with some readily ionized gas. Through the press 2 extends a lead 4 which is analogous to the lead 4 in Fig. 1 in that it serves as a support for the crystal 5. The support however, is indirect.

Attached to the standard 4 is an arm 28 by means of which a tube 29 is supported. The tube 29 is provided with perforations 31 which cause it to function as a grid. It surrounds the upper end of a standard 32 which extends through the press and constitutes another lead. The standard 32 is preferably surrounded by a glass tube 33 which may be integral with the press or rest loosely thereon. A similar glass tube 34 may, if desired, be provided around the lead 4.

The upper end of the tube 29 is welded or otherwise secured to the plate 35 which is conductively connected to the plate 36 and held in spaced relation thereto. The two plates 35 and 36 serve to shield the upper part of the tube 1 from thermal effects in the lower part. The upper plate 36 is provided with upstanding lugs which loosely hold a crystal 5 in position.

A plate 38, in proximity to the upper face of the crystal 5, serves as the second electrode. Springs 41 are provided which will hold the plate 38 in contact with the upper face of the crystal 5 and exert any desired degree of pressure thereon. If it is found preferable to have this pressure smaller than that due to the weight of the plate 38, the springs 41 may exert a tension or may even support the plate 38 a small distance away from the crystal. The springs are supported, at their upper ends, by glass beads to insulate them from the bail 42 which is secured to the plate 36.

Connection to the plate 38 is made through one of the springs 41 by means of a lead 43 which preferably extends through a seal in the top of the tube 1.

A third lead 44 through the press 2 affords connection to a sheet-metal member 45 which is supported upon standards secured in the press 2. Preferably, the member 45 has the form of a slitted cylinder. The slit is shown at 48.

An alternating potential is impressed upon the electrodes 32 and 45 by the secondary 50 of a transformer supplied from a source 51. Because of the great difference in area of the two electrodes, the sheet-metal member 45 acts as a cathode and the rod 32 as an anode.

A relay 52, corresponding to the relay 24 in Fig. 1, is included in circuit with the source 51 and the electrodes 32 and 45.

The lead 43 and the lead 4 are connected to opposite sides of a resonant circuit, including an inductance 11 and a condenser 12 which correspond to the similarly designated parts in Fig. 1. A source 13 of periodic energy serves to energize the circuit 11—12 and is analogous to the source 13 in Fig. 1.

Figure 3:
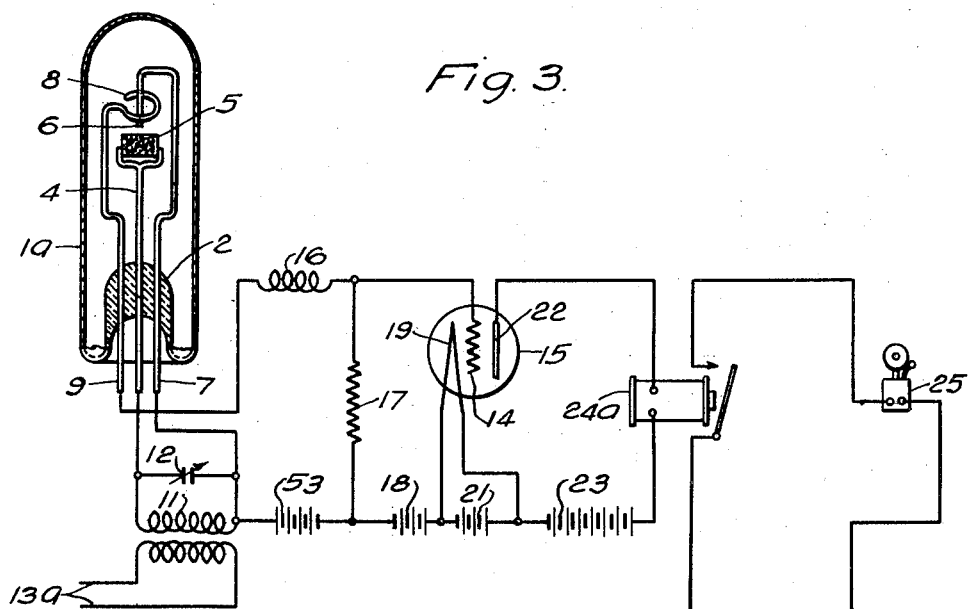
Fig. 3 is a similar illustration of an application of our invention to a system requiring two frequencies.
Figure 3:
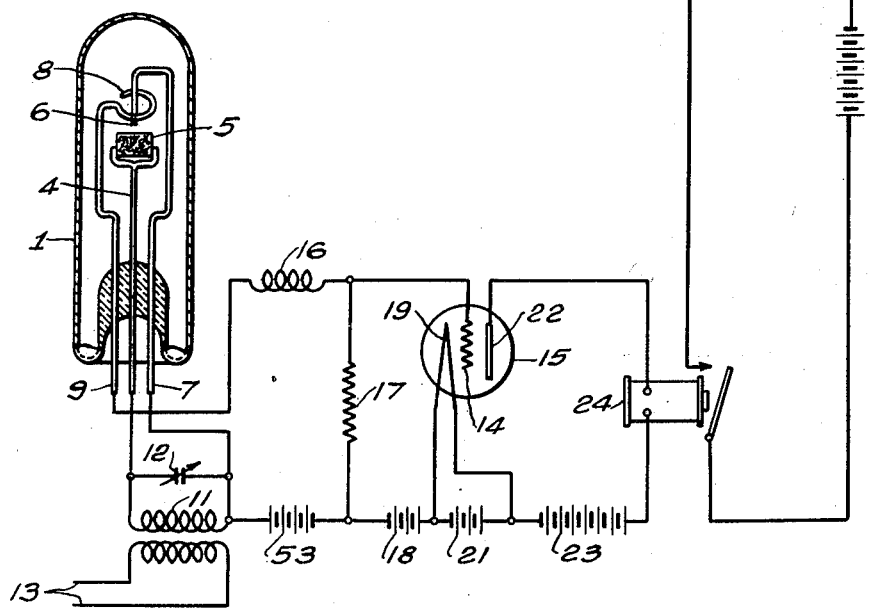

In Fig. 3, the electric bell 25 is shown in a circuit controlled by two relays 24 and 24a analogous to the relay 24 in Fig. 1. Two sources 13 and 13—a of periodic energy are analogous to the source 13 in Fig. 1. Two tubes 1 and 1a, corresponding to the tube 1 in Fig. 1, control the relays 24 and 24—a.

The circuit for relay 24 in Fig. 3 is a modification of the circuit shown in Fig. 1. The batteries 18, 21 and 23 in Fig. 3 are analogous to the similarly numbered batteries in Fig. 1. Instead of a battery in Fig. 1, analogous to the battery 53 in Fig. 3, ground connections 54 and 55 are shown.

In the operation of the device, periodic current is received from the source 13 and causes oscillations of the circuit 11—12. As the period of the received current changes, resonance phenomena occur in the circuit 11—12. The crystal 5 is connected in parallel to the condenser 12 and serves to give great sharpness to the resonance. When the energy supplied at 13 corresponds exactly, in frequency to the natural frequency of the crystal 5, a potential is set up across the electrodes 4 and 6 which exceeds the ionizing potential of the gas in the tube 1.

The magnitude of the potential between the electrodes 4 and 6 may be so regulated that the maximum thereof is just sufficient to produce ionization. The smaller the potential, provided it is sufficient for this purpose, the greater the sensitiveness of the device to changes in frequency. The potential may be diminished either by diminishing the potential impressed at 13 or by loosening the coupling between the source 13 and the inductance 11.

When the potential between electrodes 4 and 6 exceeds the ionizing potential, the gas within the tube 1 becomes conductive, and the electrode 7 is, in effect, connected to the electrode 8. As a consequence, any charge which may be present upon the grid 14 is permitted to dissipate, flowing through the tube 1 to the ground at 54. Normally the grid 14 is at a potential fixed by the battery 18, but, when the tube 1 becomes conductive, current flows from the battery 18 through the resistance 17, the choke 16, the tube 1, the lead 7 and through the grounds 54 and 55 to the battery. The potential of the grid, which is the potential at the upper end of the resistor 17, is not now that of the negative end of the battery 18 but differs therefrom by the drop through the resistor. It is, therefore, more positive than when the tube 1 was nonconductive. The change of the potential of the grid 14 permits the tube 15 to become conductive. The battery 23, therefore, sends current through the relay 24 which causes the operation of the bell 25.

In the operation of the invention as shown in Fig. 2, the grid 29 is normally insulated. It is electrically continuous with the bail 42 and the lead 4. The bail 42 is insulated by the beads from any connection outside the tube except through the lead 4, and the lead 4 is insulated by the condenser 46. Consequently, as the potential of the secondary 50 influences the space between the rod 32 and the sheet-metal member 45, electrons accumulate upon the grid 29 and soon become sufficient to prevent any flow of current from the anode 32 to the cathode 45.

When the frequency of the current supplied at 13 corresponds to the natural period of the crystal 5, an ionizing potential is created within the tube, and leakage occurs either at the beads or between the plate 38 and the plate 36.

The insulated system, comprising one side of the condenser 46, the grid 31 the plates 35 and 36 and the bail 42, is thus united with the oscillating circuit 11—12 and so to the ground at 56. The ground-connection 56 is not necessary because the capacity of the oscillating circuit 11—12 is sufficiently great compared with the capacity of the said insulated system, to cause a very material diminution in the potential of the grid 29. The secondary 50 is, therefore, able to establish a current from the anode 32 to the cathode 45. As a consequence of this current, the relay 52 is energized and the bell 25 operates.

In the form of the invention illustrated in Fig. 3, the tubes 1 and 1a are controlled by the sources 13 and 13a in the way explained in connection with Fig. 1. When the tube 1 becomes conductive, current from the battery 53 flows over the resistor 17, and the drop over the resistor changes the potential of the grid from that of the negative end of the battery 18 to a more positive value. Therefore, the relay 24 will be energized. Similarly, when the tube 1a becomes conductive, the relay 24a is energized.

The relays 24 and 24a will be simultaneously energized only when the two frequencies corresponding to the natural periods of the two crystals arrive simultaneously. It is, therefore, necessary, in order to ring the bell 25, that the two predetermined frequencies be both present in the incoming signal.

We have found by experiment that the sensitiveness of the tubes described herein to change in frequency is very great. In the neighborhood of 500 kilocycles, relays 24 may be caused to close their contacts or to release their contacts by a change of less than one half of a kilocycle.

It will be apparent to those skilled in the art that very many applications of relays of this character are possible. For example, in the control of remote apparatus by modulated continuous waves, it has heretofore been possible to superpose only a small number of different modulation frequencies upon a common carrier wave because the frequency-responsive apparatus could not be controlled with certainty except by frequencies that were widely separated. With the present relay, frequencies that differ only slightly may be caused to control distinct pieces of apparatus without danger of confusion. Very many pieces of apparatus may, therefore, be controlled independently over one carrier wave.

Although we have described only a few specific embodiments of our invention, it will be understood by those skilled in the art that various modifications may be made in the details of construction and arrangement of parts without departing from the principles herein set forth. We desire, therefore, to be limited only to the spirit and scope of our invention, as set forth in the appended claims.

We claim as our invention:—

1. In a frequency-responsive system, a pair of electrodes, a third electrode separated from said pair, a readily ionizable medium surrounding said three electrodes, and means, including a piezo-electric crystal, for ionizing said medium when a predetermined frequency is impressed upon said pair of electrodes.

2. In a frequency-responsive system, a piezo-electric crystal, two electrodes cooperating therewith, one adjacent to each of two opposite faces, a third electrode in proximity to one of said electrodes, and a medium adapted to be rendered conductive by the potential across said crystal and extending to said third electrode.

3. In a frequency-responsive system, a tube having a low-pressure gas therein, a piezo-electric crystal mounted within said tube, a circuit including a pair of electrodes adjacent to opposite faces of said crystal, said circuit also including means for impressing periodic potential upon said electrodes, whereby, upon said impressed potential having a predetermined frequency, a portion of said gas will become ionized, a second circuit which includes said ionized portion and a translating device controlled by said second circuit.

4. In a frequency-responsive system, a tube having a low-pressure gas therein, a piezo-electric crystal mounted within said tube, a pair of electrodes adjacent to opposite faces of said crystal, means for impressing periodic potential upon said electrodes, whereby, upon said impressed potential having a predetermined frequency, the gas will become ionized, a circuit controlled by the ionization of said gas, and a translating device controlled by said circuit.

5. In a frequency-responsive system, a space-current device having a cathode, an anode and a controlled electrode normally so charged as to prevent current through said space-current device and frequency-controlled means including a piezo-electric crystal and a gas at low pressure for removing the charge from said control electrode to thereby permit current through said space-current device and a translating device responsive to said current.

6. In a frequency-responsive system, a tuned circuit, a piezo-electric crystal connected across said circuit, an ionizable medium surrounding said crystal, whereby, upon the energization of said circuit with a frequency to which said crystal is responsive, the medium will become ionized, a circuit including electrodes within said ionizable medium and a translating device controlled by said circuit.

In testimony whereof, we hereunto subscribed our names this 15th day of December, 1926, and this 21st day of December, 1926.

ALBERT M. SKELLETT.
VLADIMIR K. ZWORYKIN.